United States Patent
Bordini

(10) Patent No.: US 7,207,575 B2
(45) Date of Patent: Apr. 24, 2007

(54) SUSPENSION WITH TORSION-RESISTING CYLINDER

(75) Inventor: Giorgio Bordini, Tenerife Canarias (ES)

(73) Assignee: CNH America LLC, New Holland, PA (US)

( * ) Notice: Subject to any disclaimer, the term of this patent is extended or adjusted under 35 U.S.C. 154(b) by 170 days.

(21) Appl. No.: 11/005,281

(22) Filed: Dec. 6, 2004

(65) Prior Publication Data

US 2006/0027988 A1 Feb. 9, 2006

Related U.S. Application Data

(63) Continuation-in-part of application No. 10/911,888, filed on Aug. 5, 2004.

(51) Int. Cl.
*B60P 1/00* (2006.01)
(52) U.S. Cl. .................... 280/6.154; 180/363
(58) Field of Classification Search ............. 180/342, 180/343, 348, 349, 353, 355, 356, 359, 360, 180/361, 363, 372; 172/439; 280/6.1, 6.154
See application file for complete search history.

(56) References Cited

U.S. PATENT DOCUMENTS

| | | | |
|---|---|---|---|
| 3,160,221 A * | 12/1964 | Boone | 180/41 |
| 3,310,123 A * | 3/1967 | Abbott | 172/450 |
| 4,053,171 A | 10/1977 | Hyler | |
| 4,499,775 A * | 2/1985 | Lasoen | 73/862.57 |
| 4,614,247 A | 9/1986 | Sullivan | |
| 4,899,831 A * | 2/1990 | Schillings et al. | 172/810 |
| 5,404,958 A | 4/1995 | Weiss | |
| 5,538,264 A | 7/1996 | Brown et al. | |
| 6,042,131 A | 3/2000 | Bailey | |
| 6,044,915 A * | 4/2000 | Schlegel et al. | 172/439 |
| 6,491,129 B1 | 12/2002 | Young et al. | |
| 6,502,840 B1 | 1/2003 | Leyonhjelm et al. | |
| 6,722,994 B2 | 4/2004 | Woods et al. | |
| 2002/0175486 A1 | 11/2002 | Young et al. | |
| 2003/0047892 A1 | 3/2003 | Goddard | |

* cited by examiner

*Primary Examiner*—Paul N. Dickson
*Assistant Examiner*—Tiffany Webb
(74) *Attorney, Agent, or Firm*—Stephen A. Bucchianeri; John William Stader; Michael G. Harms

(57) ABSTRACT

A rear tractor suspension for a tractor includes a suspension arm pivotally coupled to the chassis of the tractor, and a hydraulic cylinder coupled to the suspension arm to support it. The hydraulic cylinder conveys only longitudinal forces in a first mode of operation in which the suspension is not substantially loaded. When a substantial load is placed upon the suspension and the suspension arm begins to bend within normal operational and design limits, the hydraulic cylinder counteracts the load applied to the suspension, the torsional moment it produces, and the torsioning of the suspension arm by automatically applying a counteracting torsional moment to the suspension arm.

12 Claims, 6 Drawing Sheets

SUSPENSION WITH TORSION-RESISTING CYLINDER

CROSS-REFERENCE TO RELATED APPLICATIONS

This application is a continuation-in-part of U.S. patent application Ser. No. 10/911,888, filed Aug. 5, 2004.

FIELD OF THE INVENTION

The present invention relates generally to suspensions. More particularly, it relates to tractor suspensions, and even more particularly to rear suspensions for agricultural tractors.

BACKGROUND OF THE INVENTION

Agricultural tractors have traditionally been unsprung. From their earliest beginnings in the late 1800's they have been supported on fixed axles extending from the chassis.

Originally tractors were used as stationary engines. Located in a fixed position in a field, farmers would gather crops to be threshed and bring them in wagon loads to the tractor and a belt-driven threshing machine. In these early days the ability to move fast was not important.

Tractors were gradually modified to tow implements such as plows, rakes, harrows, planters, and manure spreaders through agricultural fields. These mobile tractors did not need a great deal of speed since they replaced horses or oxen and needed only enough power to tow implements at horse or ox speed.

As time passed, engineers designed ever larger and stronger implements. To tow these implements, tractors were also made stronger and larger, with ten to fifty times the horsepower of the early tractors.

Eventually, agricultural tractors were capable of towing implements at higher speeds through agricultural fields. To accommodate these greater speeds, manufacturers began to develop front suspensions with springing and shock absorbing capability. These front suspensions were configured to pivot, permitting the front wheels of the tractor to keep a good grip on the ground as the terrain changed. As of today, however, no major manufacturer of tractors sells a commercially accepted agricultural tractor with a sprung rear suspension.

A primary reason that tractors with sprung rear suspensions have not been manufactured is due to the reaction forces that arise when a load is placed on the tractor. Traditional agricultural tractors have large rear wheels, typically on the order of approximately 1 to 2.2 meters in diameter. The large rear wheels apply high force to the ground, especially when a ground-engaging implement is ripping furrows through the ground 2 to 18 inches deep. The ground, in turn, applies an equally high (but in the opposite direction) reaction force on the frame of the tractor, and the reaction force can generate a moment great enough to literally lift the front wheels of a tractor without a rear suspension a meter or more off of the ground.

The existence of a moment large enough to lift the front wheels is best illustrated with reference to FIG. 8, which schematically shows a tractor 700 without a front or rear suspension towing an implement 148. An implement, resultant-force vector 402 is applied to the implement by the ground as the implement is pulled through the ground by the tractor 700. Implement force vector 402 can be broken down into two force vectors 404, 406 that represent the horizontal force (vector 404) acting to drag on the implement during forward motion, and the vertical force (vector 406) that pulls downward on the implement.

The implement is rigidly coupled to the tractor typically through a three-point hitch. The three-point hitch couples the implement to the tractor frame via a lower point A and an upper point B. The implement force vector 402 applies draft forces on the tractor that can be separated into horizontal and vertical forces $F_{Ax}$ and $F_{Ay}$ acting through the lower link 902 (i.e., at point A) and horizontal and vertical forces $F_{Bx}$ and $F_{By}$ acting through the upper link 904 (i.e., at point B). As one of ordinary skill will appreciate, the relative magnitudes of the component draft forces $F_{Ax}$, $F_{Ay}$, $F_{Bx}$ and $F_{By}$ depend upon the geometry of the three-point pitch.

Other forces acting on the tractor 700 include weight (depicted in the drawing as mg), which acts on the center of gravity $C_G$. In response to the weight, the ground applies forces $F_f$ and $F_r$ to the tractor through the front and rear axles, respectively.

There are torques shown in FIG. 8 as well. Drive torque $T_D$ is the torque applied by the engine (not shown in FIG. 8) to the axle (also not shown) to drive the rear wheels. When the tractor is being driven forward, the drive torque is clockwise. The rear wheels, as they are being driven, apply a force on the ground, and the ground, in turn, applies an equal and opposite traction force $F_{Tr}$ on the wheels that is applied to the tractor frame. The traction force of course is responsible for forward movement of the tractor.

Drive torque $T_D$ also generates a reaction torque (that is, traction torque $T_{Tr}$) that acts on the frame of the tractor. The traction torque is proportional to the traction force $F_{Tr}$ and is counterclockwise.

The forces and torques generate moments about a point on the tractor that tend to rotate the tractor about that point. For convenience, the point will be called the center of pitch $C_p$. Its location depends upon a number factors one of ordinary skill will appreciate. While the forces and torques may generate moments that cancel each other out to some extent, the net effect of all of the moments is to generate a counterclockwise moment $M_p$ about the center of pitch when the implement force vector 402 increases. The implement force vector increases when the implement 148 hits a stone, compacted soil, or some other such condition. As previously mentioned, the increased implement force vector can be large enough to cause a moment $M_P$ about the center of pitch that is itself large enough to lift the front tires and increase the load on the rear tires.

If the rear wheels were suspended on the frame rather than being fixed, the moment $M_P$ will not at first lift the front wheels, but it will tend to cause the rear suspension to squat. Such squatting can be disconcerting to the operator and can also wreak havoc on implement depth-control systems, which typically require a constant relationship between the tractor-frame and implement-frame heights.

One of ordinary skill will appreciate that some suspension configurations will cause the tractor to rotate clockwise (rather than counterclockwise, as has been described) when the tractor is subjected to increased loads. However, for the purposes of this discussion, we will consider the more intuitive case where the tractor rotates counterclockwise in response to increased loads. Nevertheless, the basic principles (and the problems with conventional systems) described herein are the same. Moreover, the principle of operation of the preferred embodiments (which will be described below) is the same regardless of whether the suspension tends to squat or sit up.

The suspension arrangement of the present invention generates a reaction torque on the vehicle to reduce the moment $M_P$ about the center of pitch. In other words, when the tractor pulls harder on its implement, the suspension in accordance with the present invention generates an increased counteracting, or reaction, force that matches or is proportional to the increased, horizontal force vector 404. Similarly, when the tractor pulls more gently on its implement, the suspension in accordance with the present invention generates a decreased force that matches the decreased horizontal force vector 404.

The parent application describes a tractor that would solve many of these problems. The embodiments shown in the parent application have trailing swing arms that are pivotally coupled to the chassis forward of the rear axles. The particular arrangement of these links provide certain benefits, such as resistance to suspension squatting or sitting up when the load is applied and then released. The trailing link arrangement, however, does make the suspension arms more susceptible to twisting. The arms are relatively long, and (in a preferred embodiment) are subject to flexure when the rear wheels are extremely loaded.

This flexure is caused by the wheel forces acting upward on the ends of the axles twisting the suspension arm, the forces being offset from the central line of the arms, because of the large wheel span or the use of rear duals tires or both. The fact that any twisting occurs at all is due in large part to the significant loads applied to the tractor by the implements that it pulls. As explained above, implements can exert extreme loads, both backwards and downwards, on the rear of a tractor. These loads are well beyond that experienced by a typical automobile or truck.

Tractors must be engineered to handle these loads in order to have sufficient power to tow ground engaging implements through an agricultural field.

Another reason the torsion arms experience large twisting loads is due to the direction of the loads. Implement supply loads that are directed both backward and downward, and the downward component of the force asked directly on the trailing link suspension arms to twist them.

Given the extreme loads that an implement applies to the rear of the tractor, if even 25% of this force is a downward components of the force, the compress of loads on the suspension of the tractor can be extreme, on the order of over a thousand pounds of downforce.

Another reason the suspension arm is subject to twisting is due to the less than optimal location of the wheels. Unlike an automobile, which as closely spaced wheels directly adjacent to the suspension arm, the rear wheels of a typical tractor are spaced 2 to 4 meters apart at the rear of the vehicle.

Tractor wheels are mounted towards the end of a driven axle that may be some 0.5, 1.0, 1.5, or even 2.0 meters from its associated suspension arm. The reactive ground force acting through the wheels on the axle that extends from the suspension arm, has a substantial moment arm and therefore generates a significant torque or torsional moment at the suspension arm.

One seemingly plausible solution to the problem would be to make the suspension arms extremely strong, such that they resist any torsional moments or torques that is applied to them by their respective axles. Unfortunately, suspension components should be as light in weight as possible to reduce the unsprung mass of the vehicle.

What is needed, therefore, is a system that stiffens or strengthens a rear suspension for tractor to resist the twisting forces applied to the suspension arm. What is also needed is a system for stiffening or strengthening a tractor suspension that does not require significant additional mass.

It is an object of this invention to provide a tractor and tractor suspension that has these benefits.

SUMMARY OF THE INVENTION

In accordance with the first aspect of the invention, a tractor is provided, including a chassis; an engine mounted on the chassis; a pair of steerable front wheels; left and right rear wheels; a left rear suspension including a left suspension arm pivotally coupled to the chassis and a left hydraulic cylinder coupled to the left suspension arm; a right rear suspension including a right suspension arm pivotally coupled to the chassis and a right hydraulic cylinder coupled to the right suspension arm; wherein the left and right hydraulic cylinders are coupled to the suspension arm to transmit only longitudinal forces between their respective suspension arms and the chassis in a first tractor load state, and to transmit both longitudinal forces and torsional moments between their respective suspension arms and the chassis in a second tractor load state greater than the first tractor load state.

The left and right cylinders may include a cylinder body and a rod assembly slidingly disposed inside a cylinder body. The cylinder body may include a first eye configured to transmit only longitudinal forces to the respective left and right suspension arms in a first orientation and to transmit to the respective left and right suspension arms both longitudinal forces and torsional moments in a second orientation. The first eye may define a spherical aperture and includes a sphere disposed inside said aperture, wherein the sphere is pivotable within said aperture, and further wherein the sphere includes a means for coupling the sphere to the respective left and right suspension arms. The first eye may further include first and second eye blocks, and a means for coupling said first and second eye blocks together, wherein the first eye blocks defines a first hemisphere of said spherical aperture and the second eye block defines a second hemisphere of said spherical aperture. The first and second eye blocks may collectively define a first slot and a second slot, wherein said first slot is diametrically opposed to said second slot, and further wherein said first and second slots together define a range of motion of said first eye over which range said left and right cylinders transmit only longitudinal forces.

In accordance with a second embodiment of the invention, a suspension for a tractor is provided, including a suspension arm pivotally coupled to a chassis of the vehicle to pivot about a pivotal axis; a vehicle-supporting wheel mounted to the suspension arm; and a suspension cylinder coupled to the suspension arm to support the suspension arm with respect to the vehicle; wherein the suspension cylinder is configured to transmit only forces parallel to the longitudinal axis of the cylinder when a first design operational load is on the wheel, and is configured to both apply a torque and transmit longitudinal forces when a second design operational load greater than the first operational load is on the wheel.

The torque may be applied in a direction that counteracts torsioning of the suspension arm by the second load. The suspension cylinder may be coupled to a gas-charged accumulator to function as a spring. The suspension arm may be a trailing link and the pivotal axis is oriented side-to-side with respect to the vehicle. The suspension cylinder may be coupled to the rear end of the trailing link. The suspension arm may extend generally longitudinally and is pivotally coupled to the chassis at its the suspension cylinder may be oriented generally vertically. The suspension may include an axle coupled to and extending from the suspension arm. The suspension cylinder may extend generally vertically, the suspension arm may extend generally fore-and-aft with respect to the vehicle, and the axle may extend side-to-side and away from the vehicle. The suspension may further include a wheel having a diameter of at least 1.5 meters that is coupled to the axle at a position at least 0.5 meters from the suspension arm.

Numerous other features and advantages of the present invention will become readily apparent from the following detailed description, the accompanying drawings, and the appended claims.

DETAILED DESCRIPTION OF THE PREFERRED EMBODIMENTS

Figure 1:
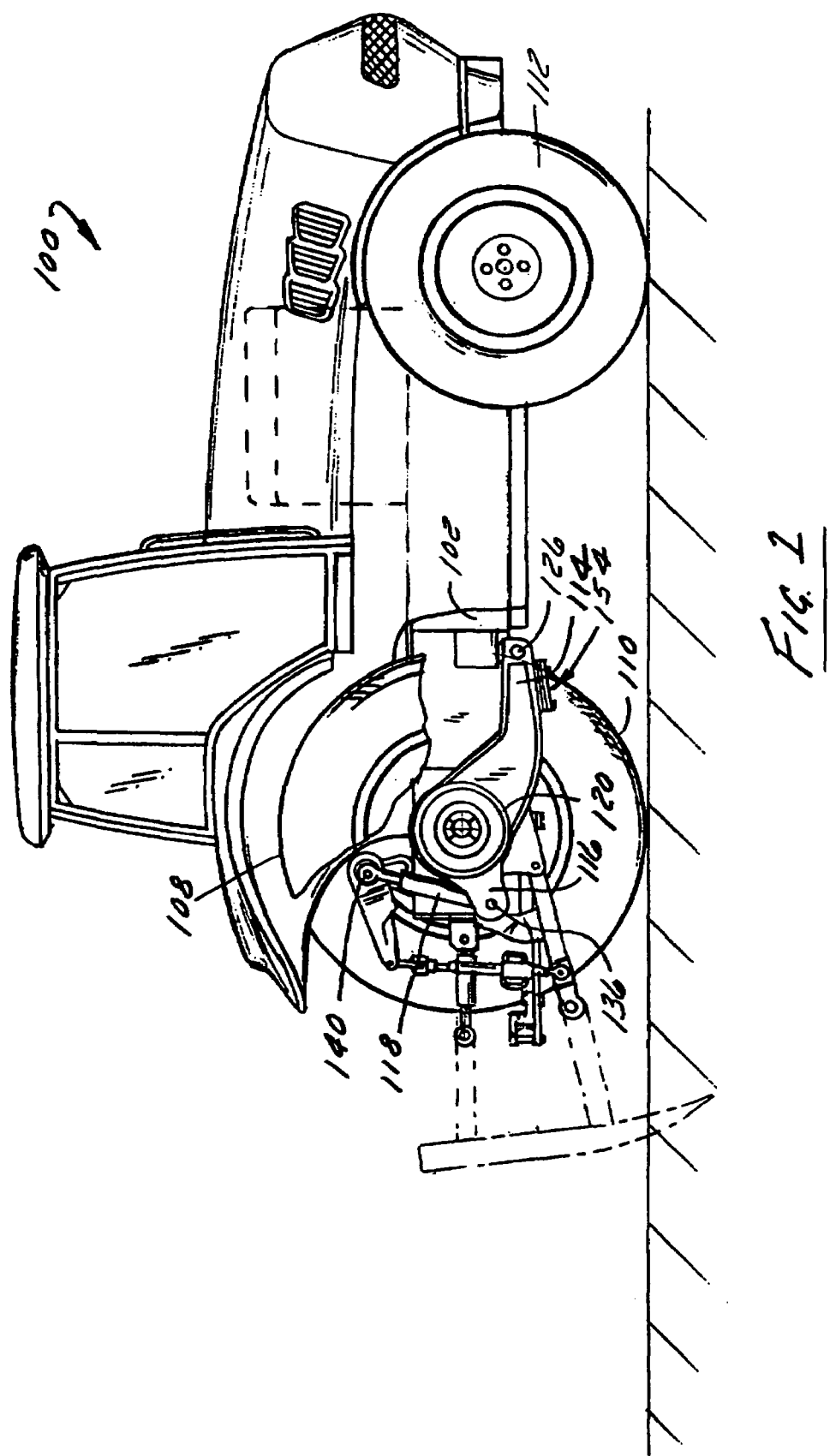
FIG. 1 is a side view of a tractor in accordance with the present invention.

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Figure 2:
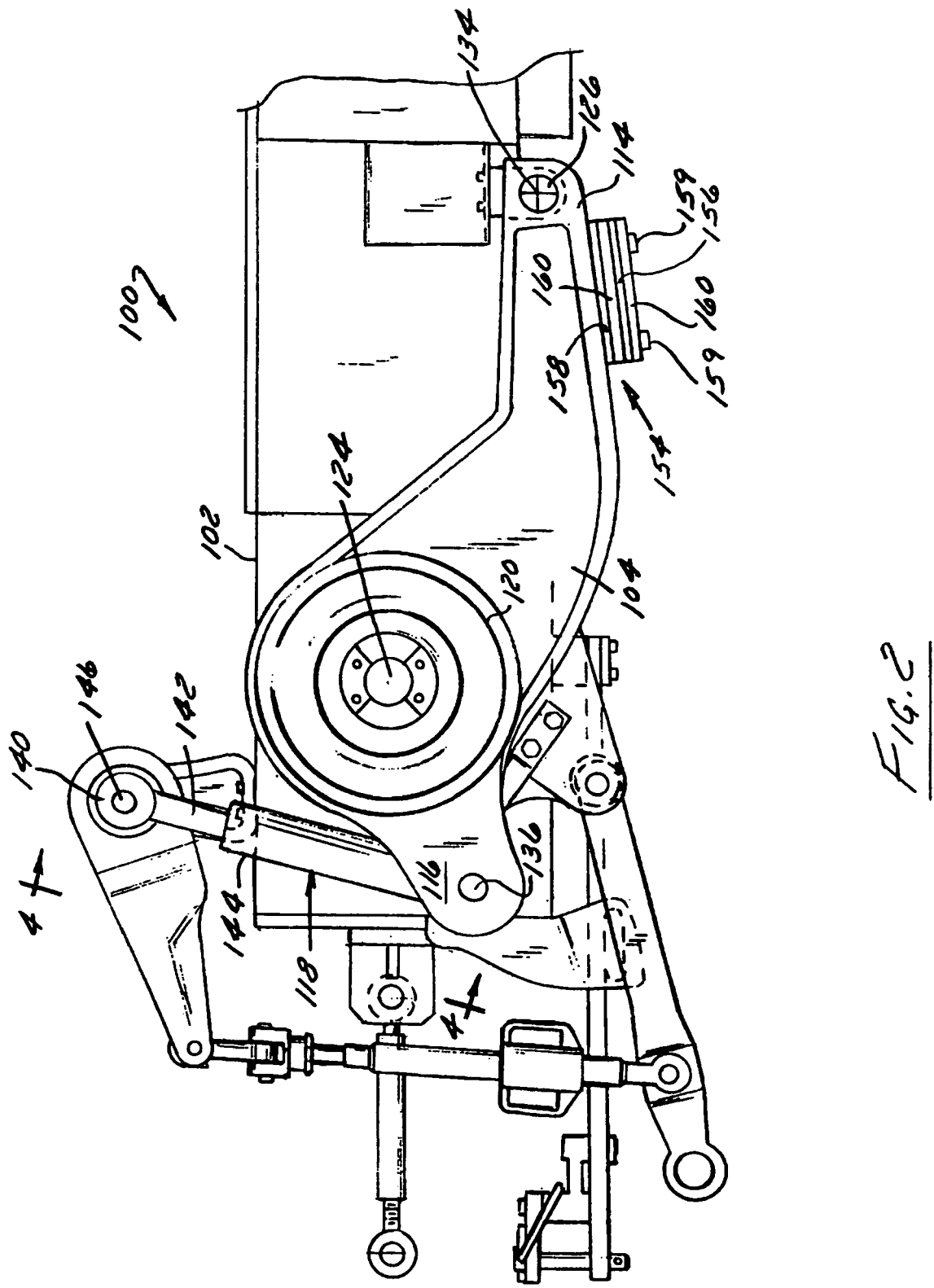
FIG. 2 is a fragmentary side view of the tractor of FIG. 1, showing the chassis and rear suspension in greater detail.
Figure 3:
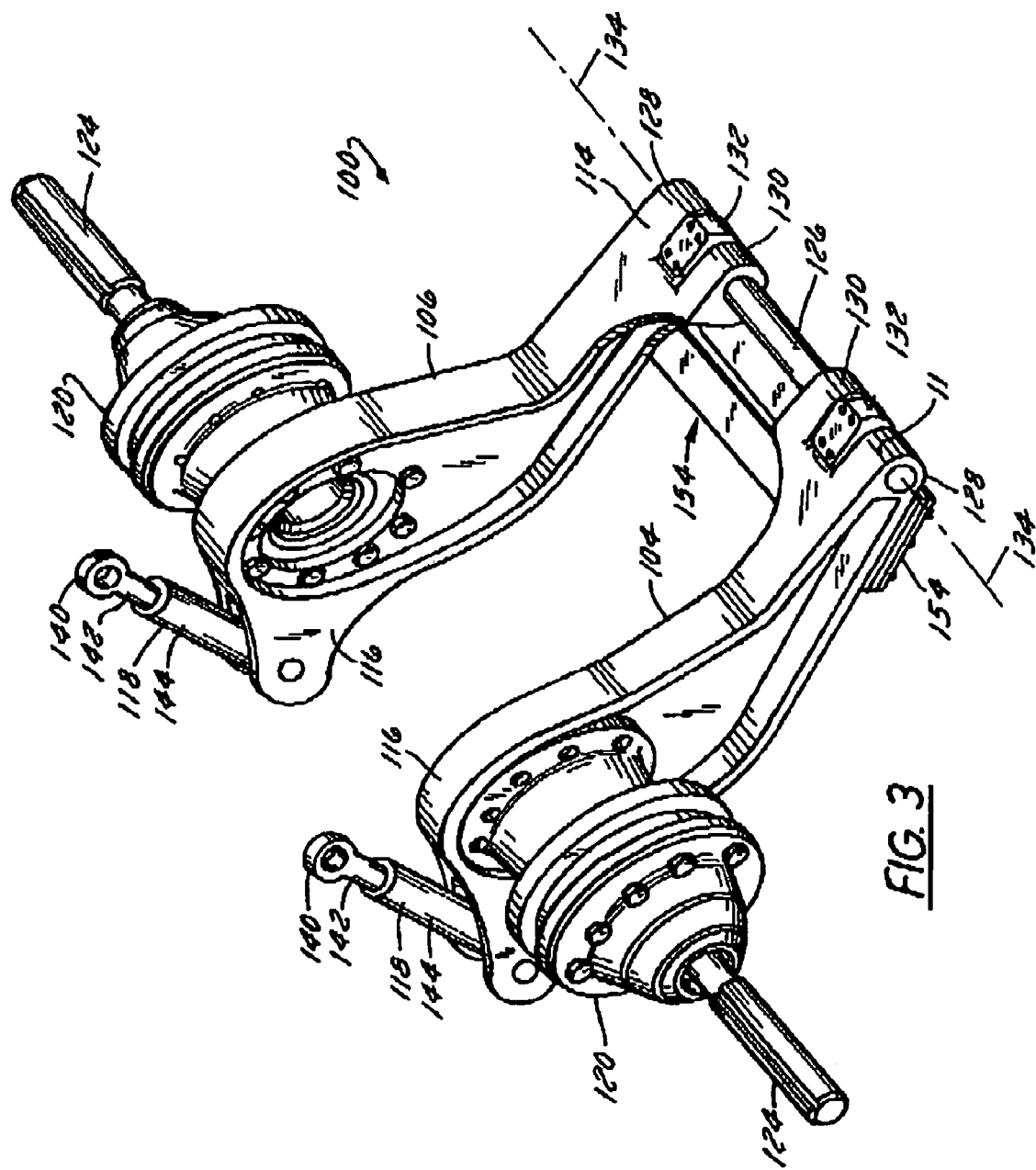
FIG. 3 is a perspective view of the suspension arms, springs, linkage and pivot pin of the tractor of the foregoing FIGURES.

FIGS. 1, 2 and 3 show a tractor 100 having a chassis 102 to which right and left suspension arms 104, 106 (FIG. 3) are coupled. Rear wheels 108, 110 are mounted to axles 124 extending from suspension arms 104, 106 and support the tractor for movement over the ground. The axles extend laterally, or side to side, with respect to the tractor. The wheels (including tires) preferably have a diameter of at least 1.5 meters, more preferably at least 2 meters, and even more preferably at least 2.5 meters. They may be fixed to axles 124 at several positions along the length of the axle including positions at least 0.25, 0.5, 1.0, and 1.5 meters or more away from the suspension arm. This is quite unlike automobiles or trucks, in which wheels of 0.3 meter diameter are mounted on axles that extend perhaps 0.2 meters from a suspension arm. Two front wheels 112 (only one shown) are coupled to the front portion of the chassis to support the front of the vehicle.

Referring in particular to FIG. 3, each suspension arm 104,106 has a front end 114 and a rear end 116. The suspension arms are oriented generally fore-and-aft and extend longitudinally along the side of the tractor. The suspension arms are trailing links. The front end 114 is pivotally coupled to the chassis and the rear end 116 is supported by a spring 118. Spring 118 in the preferred embodiment shown here is a hydraulic cylinder that is coupled to a hydraulic circuit including valves and a gas-charged hydraulic accumulator (circuit not shown) to keep the spring 118 extended the appropriate amount.

Hydraulic cylinder 118 in the preferred embodiment shown here is coupled to a gas-charged hydraulic accumulator 119 (see FIG. 5) As the tractor is loaded and unloaded, the hydraulic cylinders coupled to the accumulator (or accumulators) act as springs. When the load increases on the rear of the tractor, the suspension arms push upward on the cylinder portion of cylinders 118. This increases the hydraulic pressure in the cylinder and ejects hydraulic fluid into the gas-charged accumulator 119. This additional hydraulic fluid in the accumulator causes the pressure in the accumulator and the cylinder to increase until the cylinder pressure is just able to counteract the increased force acting on the swing arm.

When the load is decreased on the rear of the tractor, the reverse is true. Cylinders 118 gradually extend. pivoting the rear of suspension arms 104, 106 downward, permitting hydraulic fluid to escape the accumulator (or accumulators), and permitting the pressure inside the cylinders to decrease until it just balances the reduced load applied to swing arms 104, l06.

Each suspension arm has an associated planetary gear system 120, which is fixed to the rear end 116 of each suspension arm. The planetary gear system 120 supports the axle 124 that extends from the gear system. The left and right rear wheels 108, 110 are mounted to left and right axles 124

The front end 114 of each suspension arm 104, 106 is preferably coupled to chassis 102 by a pin 126. Pin 126 extends through an inner eye member 130 and an outer eye member 128 formed in the front end 114 of the suspension arm. Pin 126 also extends through an eye member 132 (FIG. 3) that is fixed to chassis 102 and fits between the inner and outer eye members 128, 130 on the suspension arms 104, 106. Pin 126, eye members 128, 130 and eye member 132 are closely toleranced, such that suspension arms 104, 106 are constrained by pin 126 to rotate about a laterally extending axis 134 best seen in FIG. 3. This arrangement also constrains the rear ends 116 of the two suspension arms to pivot about axis 134 and (in general) to move only up and down with respect to the chassis 102.

Referring to FIG. 2, each spring 118 is coupled at its lower end to its associated suspension arm by a pivot pin 136 that extends through the suspension arm and through an eye formed in the lower end of the spring 118. This arrangement permits the lower end of the spring 118 to pivot with respect to the suspension arm. A similar eye 140 is formed in the upper end of rod 142 extending from the hydraulic cylinder body 144 which is similarly pivotally coupled to a pin 146. Pin 146 is fixed to chassis 102 preferably via the tractor's rockshaft. However, the rod 142 may be coupled to the chassis at other locations.

The suspension arms pivot freely with respect to the chassis 102 with only two limits to their movement: the springs 118 and inter-arm, or sway, link 154. As shown in FIG. 3, link 154 is coupled to and extends between both of the suspension arms 104, 106. The sway link 154 is essentially an anti-roll bar providing a passive, anti-roll function. The sway link 154 can be used alone or in conjunction with other anti-roll features, such as active control of hydraulic springs 118. Such active anti-roll will be discussed in more detail below.

The sway link 154 operates in the following way. When one wheel goes over a bump causing its suspension arm to pivot upward, the pivoting suspension arm flexes one end of link 154. The other end of link 154 is connected to the other suspension arm and reacts to this movement by attempting to pivot the other suspension arm upward to the exact same degree that the first suspension arm pivoted. The second suspension arm, however, is resting on ground (via the axle and wheel) at a slightly different height and is held against the ground by its own spring 118. Spring 118 of the second suspension arm resists the upward movement of the second suspension arm by link 154, preventing link 154 from moving the second suspension arm into a perfectly parallel relationship with the first suspension arm. As a result, both suspension arms do not move together to the same (i.e. parallel) positions, and the link 154 twists. The link thereby acts as a torsional spring to resist rolling motion by the tractor.

The link's ability to twist is due to its construction. As shown in FIG. 2, link 154 is formed as two parallel plates of steel 156, 158 that are spaced apart by spacers 160. Bolts 159 (FIG. 2) are inserted into holes in the ends of the plates and the spacers. These bolts are inserted into threaded holes in the suspension arms 104, 106 and tightened. Bolts 159 are located on each end of link 154 to secure left and right ends of link 154 to the left and right suspension arms, respectively.

Besides using the sway links 154 as a passive anti-roll mechanism, the springs 118 can be actively controlled to provide additional anti-roll. For example, if the right rear wheel rides over a bump while the left rear wheel descends into a dip, the spring 118 on the right can be retracted by appropriate hydraulic control and the spring 118 on the left can be extended to maintain the tractor level.

The discussion below relates to the right side suspension arm 104. The left side suspension arm 106 is identically disposed and configured as the right side suspension arm, but in mirror image form and on the opposite side of the vehicle on the left side suspension arm. Since the two are identical in construction and operation, we do not separately discuss the left side suspension arm.

Figure 4:
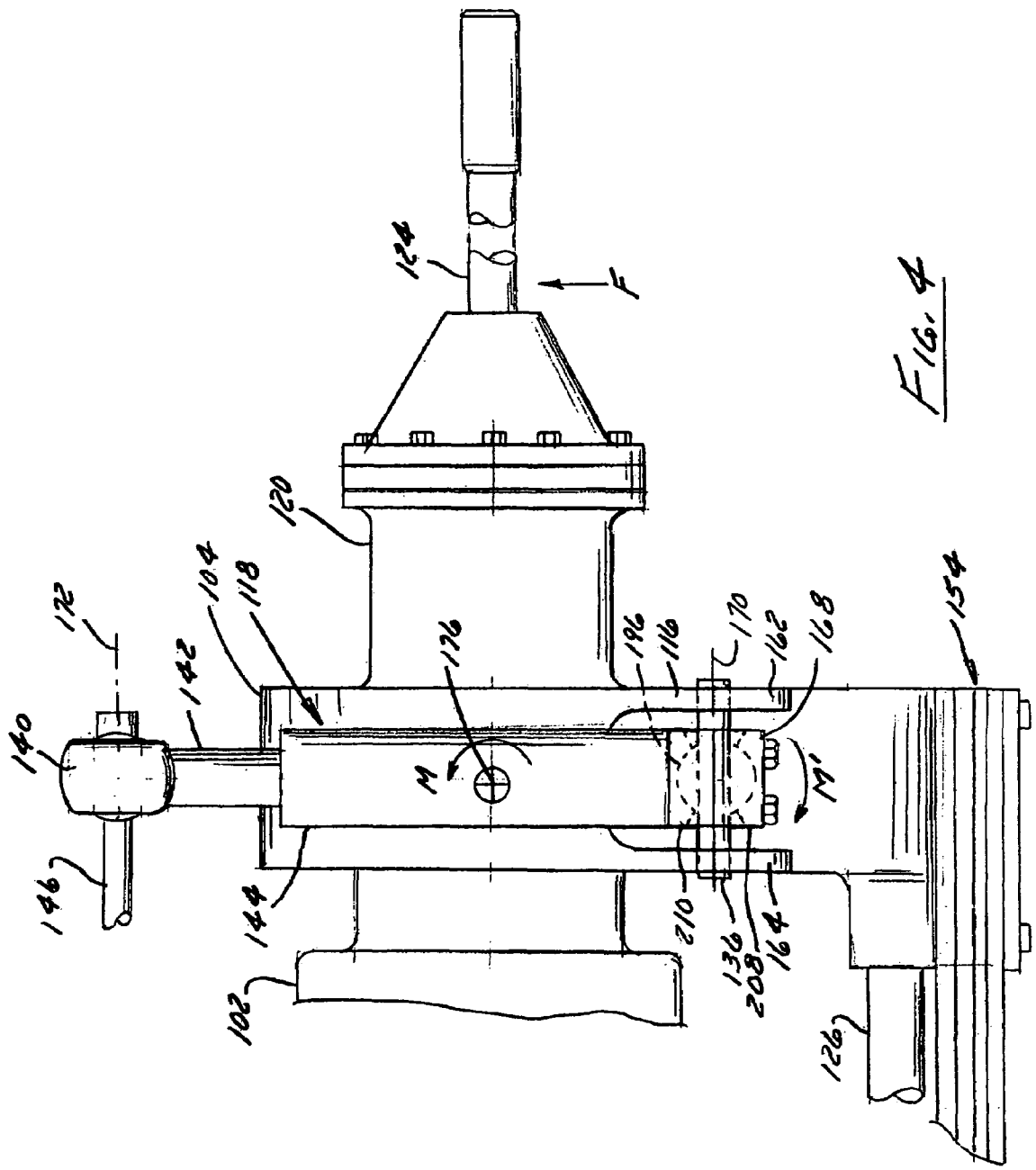
FIG. 4 is a rear view of the tractor showing the right rear suspension arm when the tractor rear suspension is unstressed. This view is taken generally along section line 4—4 in FIG. 2.
Figure 7:
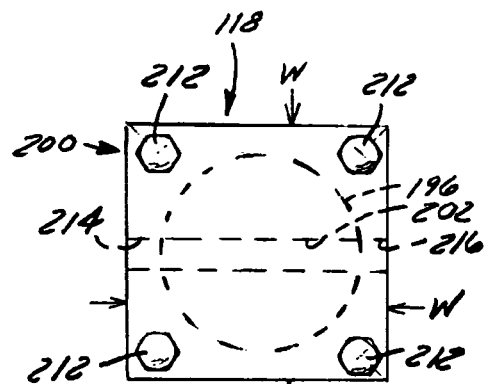
FIG. 7 is a bottom view of the right rear suspension cylinder.
Figure 6:
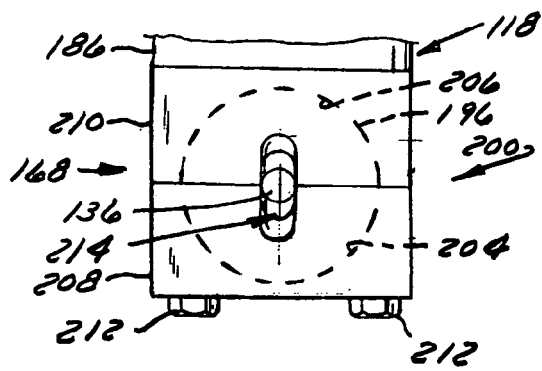
FIG. 6 is a fragmentary detail side view of the right rear suspension cylinder.

Referring now to FIG. 4, we can see the right side suspension arm 104 from the rear, facing forward and at a slightly downward angle. This view is taken generally along section line 4—4 in FIG. 2. The discussion below regarding the right side suspension is equally applicable to the left side suspension. The left side suspension is constructed identically to the right side suspension, but in mirror image form, mirrored about a plane defined by the central longitudinal axis of the vehicle and a vertical line. The description of the left side suspension has been omitted from this application since it would be merely duplicative.

In FIG. 4, we can see more clearly how cylinder 118 is coupled to both the chassis of the tractor 100 and suspension arm 104. There are two ears 162, 164 that extend rearward and downward from the back of suspension arm 104. A pin 136 extends between these ears and is supported thereby. Pin 136 extends through an eye 168 formed in the bottom of cylinder 118. Cylinder 118 can pivot about a laterally extending and generally horizontal axis 170 defined by pin 136 with respect to suspension arm 104. Axis 170 is horizontal in one position over its range of motion. Generally, its inclination depends upon the twist of arm 104. It is preferably inclined slightly outward away from the chassis of the vehicle at its upper end when the vehicle's weight is lifted off the suspension, such as when the vehicle is on a jack. It is preferably inclined with its upper end slightly inward toward the vehicle when a heavy weight or load is placed on the rear of the vehicle.

Eye 140 in the upper end of cylinder 118 is fixed to pin 146, which is fixed to and extends outward from the chassis of tractor 100. Eye 140 can pivot with respect to the chassis of tractor 100 about a laterally extending and horizontal axis 172 that is defined by pin 146.

Whenever suspension arm 104 pivots clockwise (as shown from the perspective of FIG. 2) with respect to the chassis, cylinder 118 retracts. Whenever suspension arm 104 pivots counterclockwise with respect to the chassis, cylinder 118 extends.

The suspension arms are not perfectly rigid, in order to reduce vehicle overall weight, and unsprung weight in particular. Unsprung weight is an important factor in the design of any vehicle suspension. For this reason, loads applied to axle 124 of tractor 100 cause suspension arm 104 not only to pivot about pin 126 located at the front of suspension arm 104, they also cause rear end 116 of suspension arm 104 to twist slightly. As shown in FIG. 4, the greater the force F that is applied upward on axle 124 by the right side tractor wheel 108, the greater the torsional moment M acting on arm 104. This torsional moment M causes rear 116 of arm 104 to bend or twist counterclockwise (viewed from the perspective of FIG. 4) about a generally longitudinal axis 176 with respect to the chassis of tractor 100.

A certain amount of twisting is to be expected during normal operation of the tractor. If suspension arm 104 was made strong enough to resist all twisting, it would add substantially (and unnecessarily) to the overall weight of the tractor. In a typical system, the permissible amount of suspension arm torsion at ears 162, 164 will be +/−2 degrees to +/−4 degrees. This range of motion is measured from a nominal angle of 0° in which axle 124 is horizontal. The acceptable amount of twisting for any tractor will depend upon the particular design of that tractor, the loads it will encounter, and the strength of the materials employed.

It should be recognized, however, that tractors can be overloaded. Every tractor will have some load levels that, unless counteracted, will cause excessive suspension arm twisting. This excessive twisting, if not countered, could cause excessive wear of suspension arm 104 and pin 126.

For this reason, cylinder 118 is configured to counteract torsional moment M by applying an opposing moment M' to arm 104 to the two ears 162, 164. Cylinder 118 does not counteract torsional moment M by applying its opposing moment M' when suspension arm 104 is not twisted more than the +/−2 degrees to +/−4 degrees mentioned above. These angles of twist are appropriate for the tractor suspensions illustrated here. Greater or lesser angles may be provided depending upon the strength of materials used in the suspension arms, the design loads, and the desired torsion of the arms.

As long as suspension arm 104 is bent or twisted by moment M only within this range of motion, cylinder 118 functions solely as a typical hydraulic cylinder: it communicates only longitudinal forces from arm 104 to the chassis. It applies forces to its mounting pins only in a direction parallel to the longitudinal axis of the cylinder.

When suspension arm 104 reaches the outer limits of this range of torsioning motion, hydraulic cylinder 118 assists suspension arm 104 in resisting torsional moment M. Cylinder 118 does this by applying a counteracting torsional moment M' to pin 136, which communicates that torsional moment to suspension arm 104 through ears 162, 164.

Figure 5:
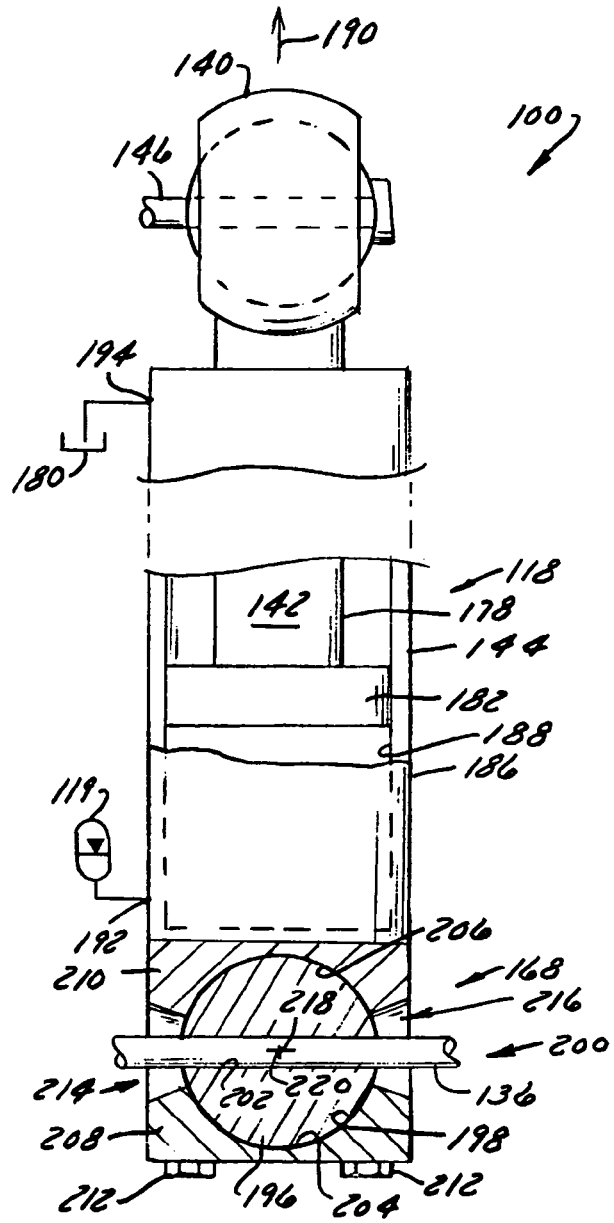
FIG. 5 is a detail view of the right rear suspension cylinder in the same position shown in FIG. 4.
Figure 8:
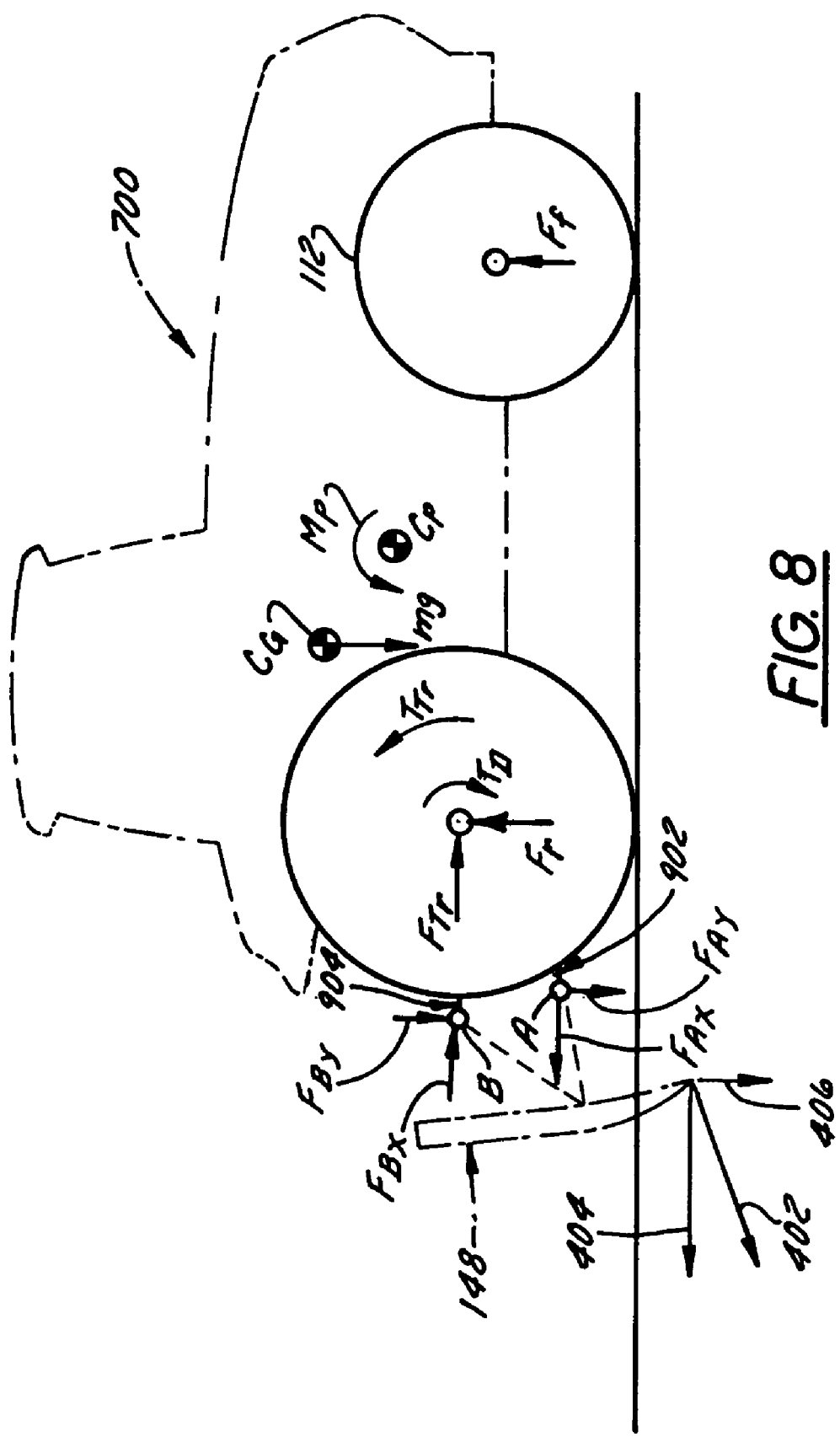
FIG. 8 is a schematic diagram showing the forces applied on the tractor by a towed implement.

Referring now to FIG. 5, we see a fragmentary rear view of tractor 100 showing only cylinder 118 in the identical position shown in FIG. 4, but with all surrounding components removed.

Cylinder 118 includes a cylinder body 144 and a rod assembly 178. Rod assembly 178 includes an elongated circular rod 142 coupled to a piston 182 at one end and coupled to eye 140 at the other end. Cylinder body 144 includes an elongated hollow circular tube 186 having an inner wall 188 against which piston 182 is sealed. Piston 182 is disposed in tube 186 which supports it for movement in a longitudinal direction parallel to the central longitudinal axis 190 of tube 186. Piston 182 is fixed to rod 142 such that as piston 182 reciprocates within tube 186, rod 142 reciprocally extends and retracts from cylinder body 144. Eye 140 is fixed to the end of rod 142 and moves together with rod 142.

Extend cylinder port 192 extends from tube 186 to conduct hydraulic fluid into and out of tube 186 between cylinder 118 and accumulator 119. When fluid flows into port 192, it causes cylinder 118 to extend.

Retract cylinder port 194 extends from tube 186 at an upper end of cylinder 118 to conduct hydraulic fluid into and out of tube 186 between cylinder 118 and tank or reservoir 180.

Accumulator 119 provides hydraulic fluid under pressure to cylinder 118, causing it to function as a spring. Tank or reservoir 180 is coupled to the upper end of cylinder 118 to maintain fluid in the rod end of cylinder 118 at a low pressure. The pressure difference between and accumulator 119 and tank or reservoir 180 is sufficient to maintain cylinder 118 in a partially extended position, thereby supporting the rear of tractor 100. The accumulator and the tank shown here are simplified representations of the actual circuit that would be employed in a working vehicle. It is anticipated that additional hydraulic valves, hydraulic conduits and sources of hydraulic fluid under pressure would be beneficial in a production vehicle.

Cylinder 118 is able to resist torsional moment M, and to resist the twisting of suspension arm 104 by applying an opposing torsional moment M' to suspension arm 104. The configuration of its lower eye 168 provides this capability.

Normally, cylinders are mounted on flexible couplings such as rubber bushings, ball joints and the like, to isolate them from torsional moments and ensure that they only experience and conduct loads that are directed along the longitudinal axis of the cylinder. This is the common way of mounting hydraulic cylinders. Consider, for example, gas springs on rear doors of vehicles or shock absorbers on automobile suspensions. The ends of these devices are typically mounted on ball joints or rubber bushings two ensure that only longitudinal forces are conveyed. Other components, such as the door hinges or the suspension pivot joints, convey torsional moments from one component to another.

In the present application, however, the hydraulic cylinders are configured to transmit or transfer torsional moments to the structures to which they are mounted. This capability necessitates engineering rod 142, piston 182, and tube 186 stronger than the typical hydraulic cylinder. Further, lower eye 168 is configured to transmit these torsional loads.

Eye 168 includes a spherical ball 196 that is disposed in a ball cavity 198 formed in the lower end 200 of cylinder 118. Ball 196 has an elongated hole 202 that extends entirely through ball 196. Hole 202 is preferably perpendicular to and intersects the longitudinal axis 190 of cylinder 118. Hole 202 receives and supports pin 136 which extends completely through ball 196 and is supported by ears 162, 164 which flank the lower end of cylinder 118.

Ball cavity 198 is formed in end 200 of cylinder 118. The cavity is formed by two facing and hemispherical concavities 204, 206 formed in facing and abutting eye blocks 208 and 210. Eye block 210 is fixed to tube 186 and preferably formed integral therewith. Eye block 208 is formed as an individual structure that is removably attached to eye block 210 by 4 threaded fasteners 212. These fasteners are disposed at each of the four corners of eye block 208. They extend through the elongated apertures in an eye block 208 and are threadedly engaged with mating threaded apertures in eye block 210.

To assemble eye 168 of cylinder 118, the operator first places ball 196 in cavity 206 of eye block 210. The operator then places eye block 208 over the exposed hemisphere of ball 196. The operator then inserts the four fasteners 212 into their corresponding holes in eye block 208 until they engage their mating threaded apertures in eye block 210. The operator then tightens the bolts until all play or slack is removed. The ball may be lubricated to insure that it moves freely over its predetermined range of free motion.

The diameter both of hole 202 and pin 136 is preferably between 25 and 50 mm. The diameter of ball 196 is preferably between 80 and 100 mm. The width W of eye blocks 208, 210 is preferably between 120 and 150 mm.

Pin 136 has a limited range of movement with respect to eye 168. Pin 136 extends through hole 202 in ball 196 and is fastened at both ends to holes in ears 162, 164. Pin 136 makes an interference fit with hole 202. Whenever pin 136 moves with respect to cylinder 118, ball 196 moves exactly the same. Eye blocks 208, 210 define two slots 214, 216 that extend generally parallel to the longitudinal axis 190 of cylinder 118. These slots are as wide as pin 136 and extend completely through the wall of eye blocks 208, 210, extending from the inside surface of eye blocks 208, 210 to their outside surface. Each end of pin 136 passes through these slots.

Slots 214, 216 and a spherical shape both ball 196 constrain pin 136 to a particular narrow range of movement. First, since ball 196 constrains pin 136 to rotate about the center point 218 of ball 196, whenever one end of pin 136 moves up in slot 214, the other end of pin 136 must move down in slot 216, and vice versa. Second, since slots 214, 216 have a width equal to the width of pin 136 and since they extend generally in the longitudinal direction of the cylinder, pin 136 cannot pivot about the longitudinal axis of cylinder 118. Pin 136 can only pivot about an axis 220 that passes through the center of ball 196. This axis defines the plane in which pin 136 pivots. This plane is generally parallel to the longitudinal axis 190 of cylinder 118. Axis 220 about which pin 136 pivots is perpendicular to longitudinal axis 190 of cylinder 118. Axis 220 also passes through the center 218 of ball 196.

Slots 214, 216 extend parallel to the longitudinal axis 190 of cylinder 118 a length sufficient to permit pin 136 to pivot +/-2° to +/-4° with respect to cylinder 118. The exact distance will vary depending upon the diameter of pin 136, the diameter of ball 196, and the width W of eye blocks 208, 210.

When pin 136 and ball 196 pivot as far as they can go, further travel is limited by slots 214, 216 which abuts pin 136. Since pin 136 pivots about its center point in the middle of the ball, one end of pin 136 presses upward against the top of one slot and the other end of pin 136 presses downward against the bottom of the other slot. The two forces applied by the two ends of pin 136 create a torsional moment M' acting on suspension arm 104 that counteracts torsional moment M applied to axle 124 (and thence to suspension arm 104) by the wheel pressing upwards on the axle.

Hydraulic cylinder 118, therefore, applies forces to suspension arm 104 that resist the twisting of the suspension arm by loads placed on the vehicle. Cylinder 118 applies a torsional moment to suspension arm 104 that resists a torsional moment generated by the vehicle load.

Cylinder 118 can only apply a torsional moment to suspension arm 104 when pin 136 abuts the ends of slots 214, 216. As long as pin 136 is positioned in the preferred +/−2 to +/−4 degrees free play region, cylinder 118 does not apply a torsional moment to the suspension arm. As soon as pin 136 abuts the end of slots 214, 216, however, cylinder 118 will begin to apply a torsional moment to suspension arm 104.

While pin 136 does not abut the ends of slots 214, 216, the forces experienced by and transmitted by cylinder 118 are strictly longitudinal forces. No torques or moments are applied are transmitted from one end to another and no torques or moments are applied to either pin 146 or suspension arm 104. The forces transmitted by cylinder 118 can be reduced to a simple pair of opposing longitudinal forces, one acting on eye 140, and the other acting on eye 168, and both intersecting each other.

From the foregoing detailed description of the preferred embodiments, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

I claim:

1. A tractor, comprising:
    a chassis;
    an engine mounted on the chassis;
    a pair of steerable front wheels;
    left and right rear wheels;
    a left rear suspension including a left rear suspension arm pivotally coupled to the chassis and a left hydraulic cylinder coupled to the left suspension arm;
    a right rear suspension including a right rear suspension arm pivotally coupled to the chassis and a right hydraulic cylinder coupled to the right suspension arm;
    wherein the left and right hydraulic cylinders are coupled to the suspension arm to transmit only longitudinal forces between their respective suspension arms and the chassis in a first tractor load state, and to transmit both longitudinal forces and torsional moment between their respective suspension arms and the chassis in a second tractor load state greater than the first tractor load state;
    wherein the left and right cylinders include a cylinder body, and a rod assembly slidingly disposed inside the cylinder body, the cylinder body including a first eye configured to transmit longitudinal forces to the respective left and right suspension arms in a first orientation, and to transmit to the respective left and right suspension arms both longitudinal forces and torsional moments in a second orientation;
    the first eye defines a spherical aperture and includes a sphere disposed inside said aperture, wherein the sphere is pivotable within said aperture, and further wherein the sphere includes a means for coupling the sphere to the respective left and right suspension arms, and
    further wherein the first eye further includes first and second eye blocks, and a means for coupling said first and second eye blocks together, wherein the first eye block defines a first hemisphere of said spherical aperture and the second eye block defines a second hemisphere of said spherical aperture.

2. The tractor of claim 1, wherein the first and second eye blocks collectively define a first slot and a second slot, wherein said first slot is diametrically opposed to said second slot, and further wherein said first and second slots together define a range of motion of said first eye over which range said left and right cylinders transmit only longitudinal forces.

3. A suspension for a tractor, comprising:
    a rear suspension arm pivotally coupled to a chassis of the tractor to pivot about a first pivotal axis;
    a vehicle-supporting wheel mounted to the suspension arm: and
    a suspension cylinder pivotally coupled to the suspension arm about a second pivotal axis situated generally parallel to the first pivotal axis, to support the suspension arm with respect to the tractor;
    wherein the suspension cylinder is configured to transmit only forces parallel to the longitudinal axis of the cylinder when a first design operational load is on the wheel, and is configured to both apply a torque and transmit longitudinal forces when a second design operational load greater than the first operational load is on the wheel.

4. The suspension of claim 3 wherein the torque is applied in a direction that counteracts torsioning of the suspension arm by the second load.

5. The suspension of claim 3 wherein the suspension cylinder is coupled to a gas charged accumulator to function as a spring.

6. The suspension of claim 3 wherein the suspension arm is a trailing link and the pivotal axis is oriented laterally with respect to the tractor.

7. The suspension of claim 6 wherein the suspension cylinder is coupled to the rear end of the trailing link.

8. The suspension of claim 3 wherein the suspension arm extends generally longitudinally with respect to the tractor and the suspension arm is pivotally coupled to the chassis at a forward end and is supported by the suspension cylinder at a rearward end.

9. The suspension of claim 3 wherein the suspension cylinder is oriented generally vertically.

10. The suspension of claim 3 further comprising an axle coupled to and extending from the suspension arm.

11. The suspension of claim 10 wherein the suspension cylinder extends generally vertically, the suspension arm extends generally longitudinally with respect to the vehicle, and the axle extends generally laterally and away from the tractor.

12. The suspension of claim 10 further comprising a wheel having a diameter of at least 1.5 meters that is coupled to the axle at a position at least 0.5 meters from the suspension arm.

* * * * *